(12) United States Patent
Zhang et al.

(10) Patent No.: US 10,208,179 B2
(45) Date of Patent: Feb. 19, 2019

(54) FLAME RETARDANT THERMALLY CONDUCTIVE POLYMER COMPOSITIONS WITH GOOD FLOW PROPERTY AND USES THEREOF

(71) Applicant: SABIC Global Technologies B.V., Bergen op Zoom (NL)

(72) Inventors: Yaqin Zhang, Shanghai (CN); Mingcheng Guo, Shanghai (CN); Yun Zheng, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/320,454

(22) PCT Filed: Jun. 26, 2015

(86) PCT No.: PCT/IB2015/054828
§ 371 (c)(1),
(2) Date: Dec. 20, 2016

(87) PCT Pub. No.: WO2015/198283
PCT Pub. Date: Dec. 30, 2015

(65) Prior Publication Data
US 2017/0183475 A1    Jun. 29, 2017

Related U.S. Application Data

(60) Provisional application No. 62/017,439, filed on Jun. 26, 2014.

(51) Int. Cl.
| | | |
|---|---|---|
| C08K 3/00 | (2018.01) | |
| C09K 21/02 | (2006.01) | |
| C08K 3/22 | (2006.01) | |
| C09K 5/14 | (2006.01) | |
| C08K 3/016 | (2018.01) | |
| C08K 3/32 | (2006.01) | |
| C08K 3/38 | (2006.01) | |
| C08K 5/5435 | (2006.01) | |
| C08K 3/34 | (2006.01) | |

(52) U.S. Cl.
CPC .............. *C08K 3/016* (2018.01); *C08K 3/22* (2013.01); *C08K 3/32* (2013.01); *C08K 3/38* (2013.01); *C08K 5/5435* (2013.01); *C09K 5/14* (2013.01); *C09K 21/02* (2013.01); *C08K 3/34* (2013.01); *C08K 2003/2224* (2013.01); *C08K 2003/2227* (2013.01); *C08K 2003/329* (2013.01); *C08K 2003/387* (2013.01); *C08K 2201/001* (2013.01)

(58) Field of Classification Search
CPC .. C08K 3/0058; C08K 3/22; C08K 2201/001; C08K 2003/2224; C09K 5/14; C09K 21/02
See application file for complete search history.

(56) References Cited

U.S. PATENT DOCUMENTS

5,648,415 A * 7/1997 Hoeks ...................... C08K 3/38
524/405
2014/0171567 A1    6/2014 Guo et al.

FOREIGN PATENT DOCUMENTS

| CN | 1039602 A | 2/1990 |
|---|---|---|
| CN | 1201477 A | 12/1998 |
| CN | 101955635 A | 1/2011 |
| CN | 103786414 A | 5/2014 |
| EP | 0356379 A1 | 2/1990 |
| EP | 2468820 A | 6/2012 |
| JP | 2001181486 A | 7/2001 |
| KR | 10-0130970 | 4/1998 |
| WO | WO 1997/017410 A1 | 5/1997 |

OTHER PUBLICATIONS

Korean Patent Application No. 10-2016-7034836; Office Action; dated Oct. 19, 2017; 15 pages.

* cited by examiner

*Primary Examiner* — Robert D. Harlan
(74) *Attorney, Agent, or Firm* — Baker Hostetler LLP (57) ABSTRACT

The invention concerns compositions comprising (a) from about 20 wt % to about 80 wt % of a polymer component; (b) from about 10 wt % to about 70 wt % of a flame retardant component; and (c) from about 0.01 wt % to about 5 wt % of an acid component; wherein the combined weight percent value of all components does not exceed 100 wt %; wherein all weight percent values are based on the total weight of the composition; and wherein the composition has: (i) a thermal conductivity of at least about 1.5 W/mK for through plane thermal conductivity; (ii) flame retardancy of at least VI at 0.8 mm using the UL94 test standard; and (iii) melt volume flow rate of at least 10 g/cm3 using ASTM D 1238.

17 Claims, 1 Drawing Sheet

FLAME RETARDANT THERMALLY CONDUCTIVE POLYMER COMPOSITIONS WITH GOOD FLOW PROPERTY AND USES THEREOF

CROSS-REFERENCE TO RELATED APPLICATIONS

This application is the National Stage of International Application No. PCT/IB2015/054828, filed Jun. 26, 2015, which claims the benefit of U.S. Provisional Application No. 62/017,439, filed Jun. 26, 2014, the disclosures of which are incorporated herein by reference in their entireties.

TECHNICAL FIELD

The invention concerns flame retardant, thermally conductive polymers that have good flow properties and the use of such polymers.

BACKGROUND

Currently there are significant needs for polymer composites that are thermally conductive and flame retardant. Typically, thermal conductivity of polymer composites can be realized by addition of thermal conductive fillers into polymer resins. In order to obtain high thermal conductivity, high loading of thermally conductive fillers will typically be applied in polymer composites. This high loading makes addition of a flame retardant package into the composites much more difficult and negatively impacts the mechanical performance of thermal conductive polymer composites due to the high level of filler addition. Furthermore, high filler loading causes poor flow properties, which makes molding or other processing of the composite difficult. There is a need in the art for thermally conductive polymer composites that are flame retardant and have good flow properties.

SUMMARY

The above-described and other deficiencies of the art are met by a composition comprising: (a) from about 20 weight percent (wt %) to about 80 wt % of a polymer component; (b) from about 10 wt % to about 70 wt % of a flame retardant component; and (c) from about 0.01 wt % to about 5 wt % of an acid component; wherein the combined weight percent value of all components does not exceed 100 wt %; wherein all weight percent values are based on the total weight of the composition; and wherein the composition has (i) a thermal conductivity of at least about 0.5 watt per meter Kelvin (W/mK) for through plane thermal conductivity; (ii) flame retardancy of at least V1 at 3 millimeters (mm) using the UL94 test standard; and (iii) melt volume flow rate of at least 5 cubic centimeters per 10 minutes ($cm^3$/10 min) using ASTM D 1238.

In yet another embodiments, a composition comprises (a) from about 20 wt % to about 80 wt % of a polymer component; (b) from about 10 wt % to about 70 wt % of a flame retardant component; and (c) from about 0.01 wt % to about 5 wt % of an acid component; wherein the combined weight percent value of all components does not exceed 100 wt %; wherein all weight percent values are based on the total weight of the composition; and wherein the composition has: (i) a thermal conductivity of at least about 1.5 W/mK for through plane thermal conductivity; (ii) flame retardancy of at least V1 at 0.8 mm using the UL94 test standard; and (iii) melt volume flow rate of at least 10 $cm^3$/10 min using ASTM D 1238.

In another embodiment, a method of manufacture comprises combining the above-described components to form a composition. In yet another embodiment, an article comprises the above-described composition. In still another embodiment, a method of manufacture of an article comprises molding, extruding, or shaping the above-described thermoplastic composition into an article.

BRIEF DESCRIPTION OF THE FIGURES

The drawings illustrate generally, by way of example, but not by way of limitation, various embodiments discussed in the present document.

DETAILED DESCRIPTION

As used herein, the term "thermally conductive filler" or "thermally conductive additive", or "thermally conductive materials" refers to any additive, filler, or material which is typically inorganic, and that has a thermal conductivity higher than the polymer matrix and can help to increase the thermal conductivity of polymer materials if introduced into the polymer formulation. The thermally conductive filler may be selected from, but not limited to, AlN, $Al_4C_3$, $Al_2O_3$, BN, AlON, $MgSiN_2$, SiC, $Si_3N_4$, graphite, expanded graphite, graphene, carbon fiber, ZnS, CaO, MgO, ZnO, $TiO_2$, $H_2Mg_3(SiO_3)_4$, $CaCO_3$, $Mg(OH)_2$, mica, BaO, γ-AlO(OH), α-AlO(OH), $Al(OH)_3$, $BaSO_4$, $CaSiO_3$, $ZrO2$, $SiO_2$, a glass bead, a glass fiber, $MgO.xAl_2O_3$, $CaMg(CO_3)_2$, and a clay, or any combination thereof.

The thermal conductive filler may be of regular or irregular shape or form, including but not limited to spherical particles, whiskers, flakes, and/or platelets. In certain aspects, the thermal conductive filler is a mono-layer or multiple layer flake or platelet having an aspect ratio between 1 and 200, where aspect ratio refers to the ratio of the longest dimension to the shortest dimension of the particular filler particle, whisker, flake, and/or platelet. The filler may have a maximum dimension in a range of from about 100 nanometers (nm) to about 1500 micrometers (μm) and a minimum dimension in a range of from about 10 nm to about 100 μm.

Figure 1:
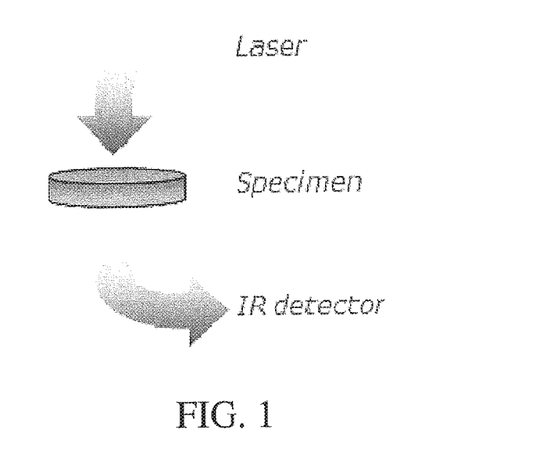
FIG. 1 illustrates a diagrammatic representation of through-plane thermal conductivity, in accordance with various embodiments.

As used herein, "through-plane thermal conductivity" is determined in accordance with ASTM E1461 using a laser flash method with a Nanoflash LFA 447 xenon flash apparatus from Netzsh Group. The test specimen is cut into a 10×10×3 mm square sample from an injection molded 80×10×3 mm IZOD bar. The measurements are provided in units of k (W/mK). Thermal conductivity k(T) is determined by thermal diffusivity, specific heat, and density of the specimen according to the equation as follows:

$$k(T)=\alpha(T)*cp(T)*\rho(T),$$

in which k(T) refers to thermal conductivity; α(T) refers to thermal diffusivity; cp(T) refers to specific heat, and ρ(T) refers to density of the specimen. The thermal diffusivity (α(T), square centimeter per second ($cm^2$/s)) can be determined by measurement of the temperature rise at the rear face of a thin-disc specimen produced by a short energy pulse on the front face (as shown FIG. 1).

The specific heat (Cp, joule per gram Kelvin (J/gK)), also called specific heat capacity, refers to the amount of energy required to raise one gram of a pure substance by one degree centigrade of the specific sample, can be tested by differential scanning calorimetery (DSC) (or determined by the same NanoflahLFA447 equipment with comparison to a standard sample with given Cp data). And the density ($\rho$, grams per cubic centimeter (g/cm$^3$)), is determined using a water immersion method (ASTM D792). Accordingly, when a through-plane value is given for a thermoplastic polymer blend composition, it is understood that the value is derived from a molded sample of the blended thermoplastic composition per the test method.

Figure 2:
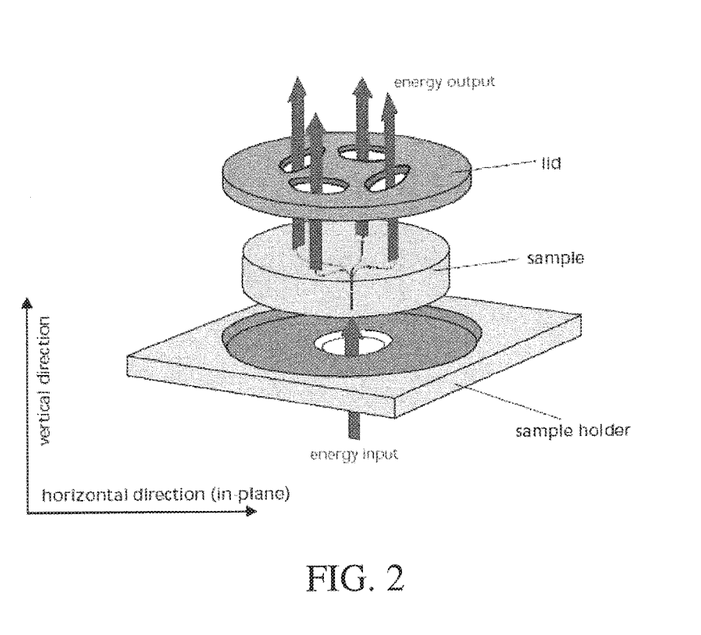
FIG. 2 illustrates a diagrammatic representation of in plane thermal conductivity, in accordance with various embodiments.

As used herein, "in plane thermal conductivity" is also determined in accordance with ASTM E1461 using laser flash method with a Nanoflash LFA 447 xenon flash apparatus from Netzsh Group, but is based on a $\Phi 25 \times 0.4$ mm round sample cut from $\Phi 100 \times 0.4$ mm sheet achieved by injection molding. Thermal conductivity k(T) is determined by thermal diffusivity, specific heat, and density of the specimen according to the equation as follows: $k(T) = \alpha(T) * cp(T) * \rho(T)$, in which k(T) refers to thermal conductivity; $\alpha(T)$ refers to thermal diffusivity; cp(T) refers to specific heat, and $\rho(T)$ refers to density of the specimen. The thermal diffusivity ($\alpha(T)$, cm$^2$/s) can be determined by measurement of the average temperature rise of four (4) testing spots at the rear face of the specimen produced by a short energy pulse on the front face (as show in FIG. 2).

The specific heat (Cp, J/gK), also called specific heat capacity, refers to the amount of energy required to raise one gram of a pure substance by one degree centigrade of the sample, can be tested by DSC (or determined by the same NanoflahLFA447 equipment with comparison to a standard sample with given Cp data). And the density ($\rho$, g/cm$^3$), is determined using a water immersion method (ASTM D792). Accordingly, when an in-plane value is given for a thermoplastic polymer blend composition, it is understood that the value is derived from a molded sample of the blended thermoplastic composition per the test method.

In some embodiments, the polymer component comprises polypropylene, polyethylene, ethylene based copolymer, polycarbonate, polyamide, polyester, polybutylene terephthalate, polyethylene terephthalate, polycyclohexylenedimethylene terephthalate, liquid crystal polymers, polyphenylene sulfide, polyphenylene ether, polyphenylene oxide-polystyrene blends, polystyrene, high impact modified polystyrene, acrylonitrile-butadiene-styrene terpolymer, acrylic polymer, polyetherimide, polyurethane, polyetheretherketone, poly ether sulphone, or combinations thereof. Certain compositions have the polymer component present in an amount from about 20 wt % to about 80 wt % and in some embodiments, about 30 wt % to about 50 wt %.

A variety of acids and/or acidic salts may be utilized in the invention. Some suitable acids are inorganic acids. In certain compositions, the acid component comprises phosphorous acid, boric acid, phosphate salt, borate salt, or a combination thereof. In yet other compositions, the acid component comprises an organic acid. Still other compositions utilize an acid component that comprises aluminum diethyl phosphinic acid. Certain compositions have the acid component that is present in an amount from about 0.01 wt % to about 5 wt % and in some embodiments, about 0.1 wt % to about 1 wt %.

In some embodiments, the composition comprises from about 20 wt % to about 80 wt % of polymer base resin; from about 10 wt % to about 70 wt % of metal hydroxide; from about 0.01 wt % to about 5 wt % of acid; from 0 to about 5 wt % silicone char-forming agents; from 0 to about 5 wt % of polymeric char-forming agent; from 0 to about 2 wt % of flame anti-flame dripping agents; and from 0 to about 60 wt % of other fillers or reinforcing agents.

The compositions of the invention possess beneficial thermal conductivity, flame retardancy and flow properties. In some embodiments, the composition has a thermal conductivity (TC) of at least about 1.5 W/mK for through plane thermal conductivity. Certain compositions have a flame retardancy of at least V1 at about 0.8 mm using the UL94 test standard. Some compositions have melt volume flow rate (MVR) of at least 10 cm$^3$/10 min using ASTM D 1238. Yet other embodiments have a melt volume flow rate (MVR) of at least 15 cm$^3$/10 min using ASTM D 1238.

In some embodiments, the compositions may further comprise from greater than 0 wt % to about 5 wt % of a silicone char-forming agent. Preferred silicone char-forming agents include one or both of an organopolysiloxane or a polydimethylsiloxane. Certain compositions have from greater than 0 wt % to about 5 wt % of other polymeric char-forming agents. Suitable polymeric char-forming agents include polyphenylene sulfide, polyphenylene ether, polyphenylene oxide, polyetherimide, polyetheretherketone, poly ether sulphone, and combinations thereof.

The polymer component may comprise any polymer that is suitable for use in the invention. Such polymers include polypropylene, polyethylene, ethylene based copolymer, polycarbonate, polyamide, polyester, polybutylene terephthalate, polyethylene terephthalate, polycyclohexylenedimethylene terephthalate, liquid crystal polymers, polyphenylene sulfide, polyphenylene ether, polyphenylene oxide-polystyrene blends, polystyrene, high impact modified polystyrene, acrylonitrile-butadiene-styrene terpolymer, acrylic polymer, polyetherimide, polyurethane, polyetheretherketone, poly ether sulphone, or combination thereof. Certain compositions have the polymer component present in an amount from about 20 to about 80 wt % or about 30 wt % to about 50 wt % in other embodiments.

In a specific embodiment, the polycarbonate copolymer is a poly(bisphenol A carbonate)-co-(bisphenol A-phthalate-ester) of formula (8a)

(8a)

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (8a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE) and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific polycarbonate copolymer is a poly(carbonate)-co-(monoaryl arylate ester) containing carbonate units (1) and repeating monoaryl arylate ester units of formula (7b)

(7b)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (8b)

(8b)

wherein $R^1$ is as defined in formula (1) and $R^h$, and n are as defined in formula (7b), and the mole ratio of x:m is 99:1 to 1:99, specifically 80:20 to 20:80, or 60:40 to 40:60.

A specific example of a poly(carbonate)-co-(monoaryl arylate ester) is a poly(bisphenol A carbonate)-co-(isophthalate-terephthalate-resorcinol ester) of formula (8c)

(8c)

wherein m is 4 to 100, 4 to 90, 5 to 70, more specifically 5 to 50, or still more specifically 10 to 30, and the mole ratio of x:m is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination thereof can be present, in a total amount of 1 to 20 mole % based on the total moles of units in the copolymers, for example resorcinol carbonate units of formula (9) and bisphenol ester units of formula (7a):

(9)

(7a)

wherein, in the foregoing formulae, $R^h$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula In an embodiment, poly(bisphenol A carbonate)-co-(isophthalate-terephthalate-resorcinol ester) (8c) comprises 1 to 20 mole percent (mol %) of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof.

In addition to the polycarbonates described above, combinations of the polycarbonate with other thermoplastic polymers, for example combinations of homopolycarbonates, copolycarbonates, and polycarbonate copolymers with polyesters, can be used. Useful polyesters include, for example, polyesters having repeating units of formula (7), which include poly(alkylene dicarboxylates), liquid crystalline polyesters, and polyester copolymers. The polyesters described herein are generally completely miscible with the polycarbonates when blended.

Copolymers comprising alkylene terephthalate repeating ester units with other ester groups can also be useful. Specifically useful ester units can include different alkylene terephthalate units, which can be present in the polymer chain as individual units, or as blocks of poly(alkylene terephthalates). Copolymers of this type include poly(cyclohexanedimethylene terephthalate)-co-poly(ethyleneterephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

The polycarbonate and polyester can be used in a weight ratio of 1:99 to 99:1, specifically 10:90 to 90:10, and more specifically 30:70 to 70:30, depending on the function and properties desired. It is desirable for such a polyester and polycarbonate blend to have an MVR of 5 to 150 cubic centimeters per 10 minutes ($cm^3$/10 min), specifically 7 to 125 $cm^3$/10 min, more specifically 9 to 110 $cm^3$/10 min, and still more specifically 10 to 100 $cm^3$/10 min., measured at 300° C. and a load of 1.2 kilograms according to ASTM D1238-04.

The composition further comprises a polysiloxane-polycarbonate copolymer, also referred to as a poly(siloxane-carbonate). The polysiloxane-polycarbonate copolymers can then be manufactured, for example, by the synthetic procedure of European Patent Application Publication No. 0 524 731 A1 of Hoover, page 5, Preparation 2.

Transparent polysiloxane-polycarbonate copolymers can be used and can be manufactured using one or both of the tube reactor processes described in U.S. Patent Application No. 2004/0039145A1 or the process described in U.S. Pat. No. 6,723,864 can be used to synthesize the poly(siloxane-carbonate) copolymers. The polysiloxane-polycarbonate copolymers can comprise 50 to 99 weight percent of carbonate units and 1 to 50 weight percent siloxane units. Within this range, the polyorganosiloxane-polycarbonate copolymer can comprise 70 to 98 weight percent, more specifically 75 to 97 weight percent of carbonate units and 2 to 30 weight percent, more specifically 3 to 25 weight percent siloxane units.

In an embodiment, the polysiloxane-polycarbonate copolymer comprises 10 wt % or less, specifically 6 wt % or less, and more specifically 4 wt % or less, of the polysiloxane based on the total weight of the polysiloxane-polycarbonate copolymer, and are generally optically transparent and are commercially available under the designation EXL-T from SABIC. In another embodiment, the polysiloxane-polycarbonate copolymer comprises 10 wt % or more, specifically 12 wt % or more, and more specifically 14 wt % or more, of the polysiloxane copolymer based on the total weight of the polysiloxane-polycarbonate copolymer, aregenerally optically opaque and are commercially available under the trade designation EXL-P from Sabic.

Polyorganosiloxane-polycarbonates can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter (mg/ml), and as calibrated with polycarbonate standards.

The polyorganosiloxane-polycarbonates can have a melt volume flow rate, measured at 300° C./1.2 kilogram (kg), of 1 to 50 $cm^3$/10 min, specifically 2 to 30 $cm^3$/10 min. Mixtures of polyorganosiloxane-polycarbonates of different flow properties can be used to achieve the overall desired flow property.

Polyesters that are obtained by polymerizing bifunctional carboxylic acids and diol ingredients may be used in the invention. Polyester resins can include crystalline polyester resins such as polyester resins derived from at least one diol, and at least one dicarboxylic acid. In one aspect, polymer blends may be utilized. Some polymer blends include, for example, compositions comprising from about 0.1 wt. % to about 90 wt. % polycarbonate component or from about 0.1 wt. % to about 90 wt. % of a polyester.

The polyetherimide resin can be selected from the group consisting of a polyetherimide, for example, as described in U.S. Pat. Nos. 3,875,116, 6,919,422, and 6,355,723; a silicone polyetherimide, for example, as described in U.S. Pat. Nos. 4,690,997 and 4,808,686; a polyetherimidesulfone resin, as described in U.S. Pat. No. 7,041,773; or combinations thereof. Each of these patents are incorporated herein in their entirety.

The polyetherimide resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, 300, 310, and 320 degrees Celsius (° C.). For example, the polyetherimide resin can have a glass transition temperature (Tg) greater than about 200 degrees Celsius. The polyetherimide resin can be substantially free (less than 100 parts per million (ppm)) of benzylic protons. The polyetherimide resin can be free of benzylic protons. The polyetherimide resin can have an amount of benzylic protons below 100 ppm. In one embodiment, the amount of benzylic protons ranges from more than 0 to below 100 ppm. In another embodiment, the amount of benzylic protons is not detectable.

The polyetherimide resin can be substantially free (less than 100 ppm) of halogen atoms. The polyetherimide resin can be free of halogen atoms. The polyetherimide resin can have an amount of halogen atoms below 100 ppm. In one embodiment, the amount of halogen atoms range from more than 0 to below 100 ppm. In another embodiment, the amount of halogen atoms is not detectable.

A variety of flame retardants are useful in the present invention. These retardants include organic and inorganic components. In an embodiment, useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Organic phosphates are one class of flame retardants. One type of organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. aromatic phosphates include, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Di- or polyfunctional aromatic phosphorus-containing compounds of this type include resorcinol tetraphenyl diphosphate (RDP), the bis(diphenyl) phosphate of hydroquinone and the bis(diphenyl) phosphate of bisphenol A, respectively, their oligomeric and polymeric counterparts, and the like.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 to 25 parts by weight (pbw), more specifically 2 to 20 parts by weight, based on 100 parts by weight of the total composition, excluding any filler.

While halogenated materials may be used in some compositions, the thermoplastic composition can be essentially free of chlorine and bromine. "Essentially free of chlorine and bromine" is defined as having a bromine and/or chlorine content of less than or equal to 100 parts per million by weight (ppm), less than or equal to 75 ppm, or less than or equal to 50 ppm, based on the total parts by weight of the composition, excluding any filler.

In some embodiments, examples of flame retardants include, but are not limited to, halogenated flame retardants, like tretabromo bisphenol A oligomers such as BC58 and BC52, brominated polystyrene or poly(dibromo-styrene), brominated epoxies, decabromodiphenyleneoxide, pentabrombenzyl acrylate monomer, pentabromobenzyl acrylate polymer, ethylene-bis(tetrabromophthalimide, bis(pentabromobenzyl)ethane, metal hydroxides like $Mg(OH)_2$ and $Al(OH)_3$, melamine cyanurate, phosphor based FR systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N-(N'-benzylaminocarbonyl) sulfanylimide potassium salt, or a combination containing at least one of the foregoing.

In some preferred embodiments, inorganic flame retardants can be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

In certain embodiments, the flame retardant component comprises a metal hydroxide. Preferred flame retardants include $Mg(OH)_2$, $H_2Mg_3(SiO_3)_4$, $\gamma$-AlO(OH), $\alpha$-AlO(OH), $Al(OH)_3$, or a combination thereof. Certain compositions have the flame retardant component present in an amount from about 10 wt % to about 70 wt % and in some embodiments, about 50 wt % to about 60 wt %.

Any suitable acid or acidic salt (e.g., derived from acid) may be utilized in the present compositions and methods. Some suitable acids are inorganic acids. In certain compositions, the acid component comprises phosphorous acid or boric acid or phosphate salt or borate salt, or combinations thereof. In yet other compositions, the acid component comprises an organic acid. Still other compositions utilize an acid component that comprises aluminum diethyl phosphinic acid, zinc phosphate, zinc borate, or a combination thereof. The acid component can comprise a component with an acidic pH value. Certain compositions have the acid component that is present in an amount from about 0.1 wt % to about 5 wt % and in some embodiments, about 0.1 wt % to about 1 wt %. Other ranges can be including such as from about 0.1 wt % to about 2 wt %, from about 0.1 wt % to about 3 wt %, from about 0.1 wt % to about 4 wt %, and any intervening ranges.

Polymers as described herein are suitable for use in a wide variety of compositions and applications as is known in the art. The additive composition can one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble and/or non-soluble in polymer.

The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be about 0.001 wt % to about 10.0 wt %, or about 0.01 wt % to about 5 wt %, or any intervening ranges including from about 0.01 wt % to about 1 wt %, from about 0.01 wt % to about 2 wt %, from about 0.01 wt % to about 3 wt %, from about 0.01 wt % to about 4 wt %, from about 0.01 wt % to about 6 wt %, from about 0.01 wt % to about 7 wt %, from about 0.01 wt % to about 8 wt %, and/or from about 0.01 wt % to about 9 wt %, each based on the total weight of the polymer in the composition.

The thermoplastic composition can further include impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than 10° C., more specifically less than −10° C., or more specifically −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth) acrylates; elastomeric copolymers of $C_{1-8}$ alkyl (meth)acrylates with butadiene and/or styrene; or combinations comprising at least one of the foregoing elastomers. materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers can be present in amounts of about 1 wt % to about 30 wt %, based on the total weight of the polymers in the composition. Intevening ranges can be used such as from about 1 wt % to about 2 wt %, from about 1 wt % to about 3 wt %, from about 1 wt % to about 4 wt %, from about 1 wt % to about 5 wt %, from about 1 wt % to about 6 wt %, from about 1 wt % to about 7 wt %, from about 1 wt % to about 8 wt %, from about 1 wt % to about 9 wt %, from about 1 wt % to about 10 wt %, from about 1 wt % to about 11 wt %, from about 1 wt % to about 12 wt %, from about 1 wt % to about 13 wt %, from about 1 wt % to about 14 wt %, from about 1 wt % to about 15 wt %, from about 1 wt % to about 16 wt %, from about 1 wt % to about 17 wt %, from about 1 wt % to about 18 wt %, from about 1 wt % to about 19 wt %, from about 1 wt % to about 20 wt %, from about 1 wt % to about 21 wt %, from about 1 wt % to about 22 wt %, from about 1 wt % to about 23 wt %, from about 1 wt % to about 24 wt %, from about 1 wt % to about 25 wt %, from about 1 wt % to about 26 wt %, from about 1 wt % to about 27 wt %, from about 1 wt % to about 28 wt %, and/or from about 1 wt % to about 29 wt %.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. An TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Antidrip agents can be used in amounts of 0.1 to 10 parts by weight, based on 100 parts by weight of the total composition, excluding any filler.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymer matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic polymers, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymer matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Co-woven structures include glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants.

Heat stabilizer additives include organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers.

Light stabilizers and/or ultraviolet light (UV) absorbing additives, also referred to as UV stabilizers, can also be used. Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); poly[(6-morphilino-s-triazine-2,4-diyl)[2,2,6,6-tetramethyl-4-piperidyl) imino]-hexamethylene[(2,2,6,6-tetramethyl-4-piperidyl)imino], 2-hydroxy-4-octyloxybenzophenone (UVINUL™ 3008), 6-tert-butyl-2-(5-chloro-2H-benzotriazole-2-yl)-4-methylphenyl (UVINUL™ 3026), 2,4-di-tert-butyl-6-(5-chloro-2H-benzotriazole-2-yl)-phenol (UVINUL™ 3027), 2-(2H-benzotriazole-2-yl)-4,6-di-tert-pentylphenol (UVINUL™ 3028), 2-(2H-benzotriazole-2-yl)-4-(1,1,3,3-tetramethylbutyl)-phenol (UVINUL™ 3029), 1,3-bis[(2' cyano-3',3'-diphenylacryloyl)oxy]-2,2-bis-{[(2'-cyano-3',3'-diphenylacryloyl) oxy]methyl}-propane (UVINUL™ 3030), 2-(2H-benzotriazole-2-yl)-4-methylphenol (UVINUL™ 3033), 2-(2H-benzotriazole-2-yl)-4,6-bis(1-methyl-1-phenyethyl) phenol (UVINUL™ 3034), ethyl-2-cyano-3,3-diphenylacrylate (UVINUL™ 3035), (2-ethylhexyl)-2-cyano-3,3-diphenylacrylate (UVINUL™ 3039), N,N'-bisformyl-N,N'-bis(2,2,6,6-tetramethyl-4-piperidinyl)hexamethylendiamine (UVINUL™ 4050H), bis-(2,2,6,6-tetramethyl-4-piperidyl)-sebacate (UVINUL™ 4077H), bis-(1,2,2,6,6-pentamethyl-4-piperdiyl)-sebacate+methyl-(1,2,2,6,6-pentamethyl-4-piperidyl)-sebacate (UVINUL™ 4092H) 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis [(2-cyano-3,3-diphenylacryloyl)oxy]-2,2-bis[[(2-cyano-3,3-diphenylacryloyl)oxy]methyl]propane; TINUVIN™ 234; nano-size inorganic materials such as titanium oxide, cerium oxide, and zinc oxide, all with particle size less than or equal to 100 nanometers; or the like, or combinations comprising at least one of the foregoing UV absorbers. UV absorbers can be used in amounts of 0.01 to 1 part by weight, based on 100 parts by weight of polycarbonate and impact modifier. UV absorbers that can be particularly useful with the polycarbonate compositions disclosed herein include 2-(2H-benzotriazol-2-yl)-4-(1,1,3,3-tetramethylbutyl)-phenol (e.g., CYASORB™ 5411 commercially available from Cytec Industries, Inc., Woodland Park, N.J.) and 2,2'-(1,4-phenylene)bis(4H-3,1-benzoxazin-4-one) (e.g., CYASORB™ UV-3638, commercially available from Cytec Industries, Inc., Woodland Park, N.J., and combinations comprising at least one of the foregoing. The UV stabilizers can be present in an amount of 0.01 to 1 wt %, specifically, 0.1 to 0.5 wt %, and more specifically, 0.15 to 0.4 wt %, based upon the total weight of the polycarbonate composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like.

The term "antistatic agent" refers to monomeric, oligomeric, or polymeric materials that can be processed into polymers and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium polymers, imidazoline derivatives, sorbitan esters, ethanolamides, betaines, or the like, or combinations comprising at least one of the foregoing monomeric antistatic agents.

Polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT™ 6321 (Sanyo) or PEBAX™ MH1657 (Atofina), IRGASTAT™ P18 and P22 (Ciba-Geigy). Other polymeric materials that can be used as antistatic agents are inherently conducting polymers such as polyaniline (commercially available as PANIPOL™ EB from Panipol), polypyrrole and polythiophene (commercially available from Bayer), which retain some of their intrinsic conductivity after melt processing at elevated temperatures. In an embodiment, carbon fibers, carbon nanofibers, carbon nanotubes, carbon black, or a combination comprising at least one of the foregoing can be used in a polymer composition containing chemical antistatic agents to render the composition electrostatically dissipative.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly $(C_{2-8})$ olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

Where a foam is desired, useful blowing agents include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents.

The present disclosure comprises at least the following aspects.

Aspect 1. A composition comprising: (a) from about 20 wt % to about 80 wt % of a polymer component; (b) from about 10 wt % to about 70 wt % of a flame retardant component; and (c) from about 0.01 wt % to about 5 wt % of an acid component; wherein the combined weight percent value of all components does not exceed 100 wt %; wherein all weight percent values are based on the total weight of the composition; and wherein the composition has (i) a thermal conductivity of at least about 0.5 W/mK for through plane thermal conductivity; (ii) flame retardancy of at least V1 at 3 mm using the UL94 test standard; and (iii) melt volume flow rate of at least 5 $cm^3$/10 min using ASTM D 1238.

Aspect 2. The composition of aspect 1, wherein the polymer component comprises a polypropylene, polyethylene, ethylene based copolymer, polycarbonate, polyamide, polyester, polybutylene terephthalate, polyethylene terephthalate, polycyclohexylenedimethylene terephthalate, liquid crystal polymers, polyphenylene sulfide, polyphenylene ether, polyphenylene oxide-polystyrene blends, polystyrene, high impact modified polystyrene, acrylonitrile-butadiene-styrene terpolymer, acrylic polymer, polyetherimide, polyurethane, polyetheretherketone, poly ether sulphone, or a combination thereof.

Aspect 3. The composition of any of aspects 1-2, wherein the polymer component is present in an amount from about 30 wt % to about 50 wt %

Aspect 4. The composition of any of aspects 1-3, wherein the flame retardant component comprises a metal hydroxide.

Aspect 5. The composition of any of aspects 1-4, wherein the flame retardant component comprises $Mg(OH)_2$, $H_2Mg_3(SiO_3)_4$, γ-AlO(OH), α-AlO(OH), $Al(OH)_3$, or a combination thereof.

Aspect 6. The composition of any of aspects 1-5, wherein the flame retardant component is present in an amount from about 50 wt % to about 60 wt %.

Aspect 7. The composition of any of aspects 1-6, wherein the acid component comprises an inorganic acid.

Aspect 8. The composition of any of aspects 1-7, wherein the acid component comprises phosphorous acid or boric acid, or both.

Aspect 9. The composition of any of aspects 1-8, wherein the acid component comprises an organic acid.

Aspect 10. The composition of any of aspects 1-9, wherein the acid component comprises aluminum diethyl phosphinic acid, zinc phosphate, zinc borate, or a combination thereof.

Aspect 11. The composition of any of aspects 1-10, wherein the acid component is present in an amount from about 0.1 wt % to about 1 wt %.

Aspect 12. The composition of any of aspects 1-11, wherein the composition has a thermal conductivity (TC) of at least about 1.5 W/mK for through plane thermal conductivity.

Aspect 13. The composition of any of aspects 1-12, wherein the composition has flame retardancy of at least V1 at about 0.8 mm using the UL94 test standard Aspect 14. The composition of any of aspects 1-13, wherein the composition has melt volume flow rate (MVR) of at least 10 $cm^3$/10 min using ASTM D 1238.

Aspect 15. The composition of any of aspects 1-14, wherein the composition has melt volume flow rate (MVR) of at least 15 $cm^3$/10 min using ASTM D 1238.

Aspect 16. The composition of any of aspects 1-13, further comprising from greater than 0 wt % to about 5 wt % of a silicone char-forming agent.

Aspect 17. The composition of aspect 16, wherein the silicone char-forming agent comprises an organopolysiloxane or a polydimethylsiloxane, or both.

Aspect 18. The composition of any of aspects 1-17, further comprising from greater than 0 wt % to about 5 wt % of a polymeric char-forming agent.

Aspect 19. The process of aspect 18, polymeric char-forming comprises polyphenylene sulfide, polyphenylene ether, polyphenylene oxide, polyetherimide, polyetheretherketone, poly ether sulphone, or a combination thereof.

Aspect 20. The composition of any of aspects 1-19, further comprising from greater than 0 wt % to about 2 wt % of an anti-flame dripping agent.

Aspect 21. The composition of aspect 20, wherein the anti-flame dripping agent comprises multi-functional modified styrene-acrylic oligomers; multi-functional amino or carboxyl chain extenders; a mixture of poly(tetrafluoroethylene) and poly(stryrene-acrylonitrile); or a combination thereof.

Aspect 22. The composition of any of aspects 1-21, further comprising from greater than 0 wt % to about 60 wt % of a filler.

Aspect 23. The composition of aspect 22, wherein the filler comprises AlN, $Al_4C_3$, $Al_2O_3$, BN, AlON, $MgSiN_2$, SiC, $Si_3N_4$, graphite, expanded graphite, graphene, carbon fiber; ZnS, CaO, MgO, ZnO, $TiO_2$, $CaCO_3$, mica, BaO, $BaSO_4$, $CaSiO_3$, $ZrO_2$, $SiO_2$, glass beads, glass fiber, $MgO \cdot xAl_2O_3$, $CaMg(CO_3)_2$, ceramic-coated graphite, or a clay; or a combination thereof.

Aspect 24. The composition of any of aspects 1-23, further comprising an additive.

Aspect 25. The composition of aspect 24, wherein the additive comprises an anti-oxidant or a UV stabilizer, or both.

Aspect 26. An article formed from the composition of any preceding aspect.

Aspect 27. The article of aspect 26, wherein the article is a molded article.

Aspect 28. A composition comprising: (a) from about 20 wt % to about 80 wt % of a polymer component; (b) from about 10 wt % to about 70 wt % of a flame retardant component; and (c) from about 0.01 wt % to about 5 wt % of an acid component; wherein the combined weight percent value of all components does not exceed 100 wt %; wherein all weight percent values are based on the total weight of the composition; and wherein the composition has: (i) a thermal conductivity of at least about 1.5 W/mK for through plane thermal conductivity; (ii) flame retardancy of at least V1 at 0.8 mm using the UL94 test standard; and (iii) melt volume flow rate of at least 10 $cm^3$/10 min using ASTM D 1238.

Aspect 29. The composition of aspect 28, wherein the polymer component comprises a polypropylene, polyethylene, ethylene based copolymer, polycarbonate, polyamide, polyester, polybutylene terephthalate, polyethylene terephthalate, polycyclohexylendimethylene terephthalate, liquid crystal polymers, polyphenylene sulfide, polyphenylene ether, polyphenylene oxide-polystyrene blends, polystyrene, high impact modified polystyrene, acrylonitrile-butadiene-styrene terpolymer, acrylic polymer, polyetherimide, polyurethane, polyetheretherketone, poly ether sulphone, or a combination thereof.

Aspect 30. The composition of any of aspects 28-29, wherein the polymer component is present in an amount from about 30 wt % to about 50 wt %

Aspect 31. The composition of any of aspects 28-30, wherein the flame retardant component comprises a metal hydroxide.

Aspect 32. The composition of any of aspects 28-31, wherein the flame retardant component comprises $Mg(OH)_2$, $H_2Mg_3(SiO_3)_4$, γ-AlO(OH), α-AlO(OH), $Al(OH)_3$, or a combination thereof.

Aspect 33. The composition of any of aspects 28-32, wherein the flame retardant component is present in an amount from about 50 wt % to about 60 wt %.

Aspect 34. The composition of any of aspects 28-33, wherein the acid component comprises an inorganic acid.

Aspect 35. The composition of any of aspects 28-34, wherein the acid component comprises phosphorous acid or boric acid, or both.

Aspect 36. The composition of any of aspects 28-35, wherein acid component comprises an organic acid.

Aspect 37. The composition of any of aspects 28-36, wherein acid component comprises aluminum diethyl phosphinic acid, zinc phosphate, zinc borate, or a combination thereof.

Aspect 38. The composition of any of aspects 28-37, wherein the acid component is present in an amount from about 0.1 wt % to about 1 wt %.

Aspect 39. A method comprising, producing a composition by mixing: (a) from about 20 wt % to about 80 wt % of a polymer component; (b) from about 10 wt % to about 70 wt % of a flame retardant component; and (c) from about 0.01 wt % to about 5 wt % of an acid component; wherein the combined weight percent value of all components does not exceed 100 wt %; wherein all weight percent values are based on the total weight of the composition; and wherein the composition has: (i) a thermal conductivity of at least about 0.5 W/mK for through plane thermal conductivity; (ii) flame retardancy of at least V1 at 3 mm using the UL94 test standard; and (iii) melt volume flow rate of at least 5 cm$^3$/10 min using ASTM D 1238.

Aspect 40. The method of aspect 39, wherein the polymer component comprises a polypropylene, polyethylene, ethylene based copolymer, polycarbonate, polyamide, polyester, polybutylene terephthalate, polyethylene terephthalate, polycyclohexylendimethylene terephthalate, liquid crystal polymers, polyphenylene sulfide, polyphenylene ether, polyphenylene oxide-polystyrene blends, polystyrene, high impact modified polystyrene, acrylonitrile-butadiene-styrene terpolymer, acrylic polymer, polyetherimide, polyurethane, polyetheretherketone, poly ether sulphone, or a combination thereof.

Aspect 41. The method of any of aspects 39-40, wherein the polymer component is present in an amount from about 30 wt % to about 50 wt %

Aspect 42. The method of any of aspects 39-41, wherein the flame retardant component comprises a metal hydroxide.

Aspect 43. The method of any of aspects 39-42, wherein the flame retardant component comprises Mg(OH)$_2$, H$_2$Mg$_3$(SiO$_3$)$_4$, γ-AlO(OH), α-AlO(OH), Al(OH)$_3$, or a combination thereof.

Aspect 44. The method of any of aspects 39-43, wherein the flame retardant component is present in an amount from about 50 wt % to about 60 wt %.

Aspect 45. The method of any of aspects 39-44, wherein the acid component comprises an inorganic acid.

Aspect 46. The method of any of aspects 39-45, wherein the acid component comprises phosphorous acid or boric acid, or both.

Aspect 47. The method of any of aspects 39-46, wherein acid component comprises an organic acid.

Aspect 48. The method of any of aspects 39-47, wherein acid component comprises aluminum diethyl phosphinic acid, zinc phosphate, zinc borate, or a combination thereof.

Aspect 49. The method of any of aspects 39-48, wherein the acid component is present in an amount from about 0.1 wt % to about 1 wt %.

Aspect 50. The method of any of aspects 39-49, wherein the composition has a thermal conductivity (TC) of at least about 1.5 W/mK for through plane thermal conductivity.

Aspect 51. The method of any of aspects 39-50, wherein the composition has flame retardancy of at least V1 at about 0.8 mm using the UL94 test standard Aspect 52. The method of any of aspects 39-51, wherein the composition has melt volume flow rate (MVR) of at least 10 cm$^3$/10 min using ASTM D 1238.

Aspect 53. The method of any of aspects 39-52, wherein the composition has melt volume flow rate (MVR) of at least 15 cm$^3$/10 min using ASTM D 1238.

EXAMPLES

The invention is illustrated by the following non-limiting examples. The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., electronic energies, bond lengths, binding energies, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

Materials

The following materials were utilized in the examples.

| Component | Chemical description | Source |
| --- | --- | --- |
| Magnifin H-5 IV | Mg(OH)$_2$ [CAS: 1309-42-8] | Albemarle |
| BNHN | Boron Nitride (BN) [CAS: 10043-11-5] | Dandong Chemical Engineering Institute Co., Ltd. |
| Ultramid B27 | Nylon 6 (PA6) [CAS: 25038-54-4] | BASF |
| Silquest A-186 Silane | Beta-(3,4-Epoxycyclohexyl)ethyltrimethoxysilane [CAS: 3388-04-3] | Momentive |
| SF 1706 | Amine functional and dimethylpolysiloxane [CAS: 67923-07-3, 68440-84-6] | Momentive |
| H$_3$PO$_3$ | Phosphorous acid, 50% water solution [CAS: 13598-36-2] | Sinopharm Chemical Reagent Co., Ltd |
| H$_3$BO$_3$ | Boric Acid, [CAS: 10043-35-3] | Sinopharm Chemical Reagent Co., Ltd. |

Physical Measurements

Physical measurements were made using the tests and test methods described herein.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as HB, V0, UL94 V1, V2, VA and/or VB.

The data were also analyzed by calculation of the average flame out time, standard deviation of the flame out time, as the total number of drips, and using statistical methods to convert that data to a prediction of the probability of first time pass, or "p(FTP)", that a particular sample formulation would achieve a V0 "pass" rating in the conventional UL94 testing of 5 bars. p(FTP) will be as close to 1 as possible, for example greater than 0.9 and more specifically greater than 0.95, for maximum flame-retardant performance in UL testing.

Melt volume flow rate (often abbreviated MVR) measures the rate of extrusion of a thermoplastic through an orifice at a prescribed temperature and load. MVR is determined using ASTM D 1238.

Thermal conductivity, (κ, W/m-K), is measured by Nanoflash LFA447 using a pyroceram reference with similar thickness. The measurement determines the thermal diffusivity (α, cm$^2$/s) and the specific heat (Cp, J/g-K) of the sample, together with the density (ρ, g/cm$^3$), which is measured using a water immersion method (ASTM D792), the product of three value gives the thermal conductivity in the through plane direction and in plane direction, according to: κ=α(T)Cp(T)ρ(T).

Sample Preparation

The flame retardant fillers, char-forming agents and fillers, reinforcing agents and any other additives may first be dry blended together, then feed into an extruder from one or multi-feeders, or separately feed into extruder from one or multi-feeders. The powder or pellet shaped organic polymer or any polymers combinations may be first dry blended with each other, or dry blended with any combination of foregoing mentioned fillers or additives, then feed into an extruder from one or multi-feeders, or separately feed into extruder from one or multi-feeders. The fillers used in the invention may also be first processed into a masterbatch, then feed into an extruder.

The organic polymers, char-forming agents, additives, fillers and reinforcing agents, masterbatch or any combination of polymers, fillers blends and the like may be fed into an extruder from throat hopper or any side feeders.

The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing. The melt blending of the composites involves the use of shear force, extensional force, compressive force, ultrasonic energy, electromagnetic energy, thermal energy or combinations comprising at least one of the foregoing forces or forms of energy.

The barrel temperature on the extruder during compounding can be set at the temperature where at least a portion of the organic polymer has reached a temperature greater than or equal to about the melting temperature, if the resin is a semi-crystalline organic polymer, or the flow point (e.g., the glass transition temperature) if the resin is an amorphous resin.

The moldable composition comprising the foregoing mentioned organic polymer and the fillers may be subject to multiple blending and forming steps if desirable. For example, the moldable composition may first be extruded and formed into pellets. The pellets may then be fed into a molding machine where it may be formed into any desirable shape or product. Alternatively, the moldable composition emanating from a single melt blender may be formed into sheets or strands and subjected to post-extrusion processes such as annealing, uniaxial or biaxial orientation.

Solution blending may also be used to manufacture the moldable composition. The solution blending may also use additional energy such as shear, compression, ultrasonic vibration, or the like, to promote homogenization of fillers with the organic polymer. In one embodiment, an organic polymer suspended in a fluid may be introduced into an ultrasonic sonicator along with any foregoing fillers. The mixture may be solution blended by sonication for a time period effective to disperse the fillers into the organic polymers. The organic polymer along with the fillers may then be dried, extruded and molded if desired.

In the examples, samples were prepared using a Twin screw extruder (Toshiba TEM-37BS, L/D=40.5), the temperature of the extruder barrel was set at 260° C. Pellets extruded from extruder were then injection molded into 10×10×0.8 mm bars were molded for FR measurement and 80×10×3 mm bars were molded then cut into 10×10×3 mm square sample for through plane TC measurement.

Results

Examples 1-3 in Table 1 show the comparative flame performance, TC and MVR results of the composites using silicone char-forming agents or combination of silicone and inorganic acids. As can be seen from control sample, for Nylon 6 base resin, with only 55 wt % of magnesium hydroxide as flame retardant, we can only get V2 @ 0.8 mm flame performance, although flame time is good and short enough, but there is flame dripping and a cotton ignition issue.

With addition of 0.5 wt % of char-forming agent SF 1706 as in example 1, we can see improvement on flame time, but there is still a flame dripping issue; Further increasing SF1706 loading to 1% as in example 2, we can see dripping issue was solved, and we can get V1 @ 0.8 mm flame performance.

In order to get V0 flame performance, phosphorous acid was loaded, as in example 3, clearly we can see further improvement on flame time and no flame dripping occurred, robust V0 @ 0.8 mm flame performance was obtained. Meanwhile, flow property was improved obviously.

TABLE 1

| Example No. | | Control 1 | EX 1 | EX 2 | EX 3 |
|---|---|---|---|---|---|
| PA6 | wt % | 34.35 | 34.3 | 33.8 | 33.9 |
| Stabilizer/mold release | wt % | 0.65 | 0.2 | 0.2 | 0.65 |
| Mg (OH)$_2$ | wt % | 55 | 55 | 54 | 55 |
| BN | wt % | 10 | 10 | 11 | 10 |
| SF1706 | wt % | | 0.5 | 1 | 0.3 |
| H$_3$PO$_3$ | wt % | | | | 0.15 |
| 0.8 mm, normal | No. of Burning Drops | 0 | 0 | 0 | 0 |
| | p(FTP)V0 | 0.85 | 0.53 | 0.92 | 0.99 |
| | p(FTP)V1 | 1.00 | 0.96 | 1.00 | 1.00 |
| | FOT 5 (s) | 27 | 29.85 | 31.45 | 16.05 |
| 0.8 mm, aging | No. of Burning Drops | 2 | 1 | 0 | 0 |
| | p(FTP)V0 | 0.19 | 0.57 | 0.41 | 1.00 |
| | p(FTP)V1 | 0.28 | 0.57 | 1.00 | 1.00 |
| | FOT 5 (s) | 35.15 | 21.5 | 41.95 | 16.8 |
| MVR (285 C./6.7 kg/360 s) | cm$^3$/10 min | 7.9 | 10.8 | 13.2 | 19.2 |
| MVR (285 C./6.7 kg/1080 s) | cm$^3$/10 min | 19.7 | 16.6 | 20.2 | 30.8 |
| Through Plane TC | W/(m*K) | 1.9 | 2 | 1.9 | 1.9 |

The data in Table 2 shows shortened flame time by using another char-forming agent Silquest A-186 silane in example 4, but still dripping. Increasing A-186 loading from 0.3% to 0.5% in example 5, dripping issue was solved and we can get V0 @ 0.8 mm flame performance. By combining 0.3% A-186 with 0.15% H$_3$PO$_3$ together as in sample 6, we can get robust V0 @ 0.8 mm flame performance with shorter flaming time than sample 5 and MVR data was increased from lower than 10 cm$^3$/10 min to nearly 20 cm$^3$/10 min.

TABLE 2

| Example No. | | Control 1 | EX 4 | EX 5 | EX 6 |
|---|---|---|---|---|---|
| PA6 | wt % | 34.35 | 34 | 34.3 | 33.9 |
| Stabilizer/mold release | wt % | 0.65 | 0.7 | 0.2 | 0.65 |
| Mg (OH)$_2$ | wt % | 55 | 55 | 55 | 55 |
| BN | wt % | 10 | 10 | 10 | 10 |
| A-186 | wt % | | 0.3 | 0.5 | 0.3 |
| H$_3$PO$_3$ | wt % | | | | 0.15 |
| 0.8 mm, normal | No. of Burning Drops | 0 | 1 | 0 | 0 |
| | p(FTP)V0 | 0.85 | 0.57 | 0.98 | 1.00 |
| | p(FTP)V1 | 1.00 | 0.57 | 1.00 | 1.00 |
| | FOT 5 (s) | 27 | 20.7 | 25.2 | 17 |
| 0.8 mm, aging | No. of Burning Drops | 2 | 3 | 0 | 0 |
| | p(FTP)V0 | 0.19 | 0.11 | 0.92 | 1.00 |
| | p(FTP)V1 | 0.28 | 0.11 | 1.00 | 1.00 |
| | FOT 5 (s) | 35.15 | 24.7 | 29.85 | 21.15 |

TABLE 2-continued

| Example No. | | Control 1 | EX 4 | EX 5 | EX 6 |
|---|---|---|---|---|---|
| MVR (285 C./6.7 kg/360 s) | cm³/10 min | 7.9 | 5.97 | 9.87 | 18.7 |
| MVR (285 C./6.7 kg/1080 s) | cm³/10 min | 19.7 | 12.7 | 13.5 | 30 |
| Through Plane TC | W/(m*K) | 1.9 | 1.9 | 1.9 | 1.9 |

Table 3 shows that if only 0.15% $H_3PO_3$ was loaded without any silicone char forming agent as in sample 7, robust V0 @ 0.8 mm flame performance is observed. Increasing loading of $H_3PO_3$ to 0.3%, FR performance is still robust and MVR is similar with EX3 and EX6 that about 20 cm³/10 min.

TABLE 3

| Example No. | | Control 1 | EX 7 | EX 8 |
|---|---|---|---|---|
| PA6 | wt % | 34.35 | 34.2 | 34.05 |
| Stabilizer/mold release | wt % | 0.65 | 0.65 | 0.65 |
| Mg (OH)₂ (wt %) | wt % | 55 | 55 | 55 |
| BN | wt % | 10 | 10 | 10 |
| H₃PO₃ | wt % | | 0.15 | 0.3 |
| 0.8 mm, normal | No. of Burning Drops | 0 | 0 | 0 |
| | p(FTP)V0 | 0.85 | 1.00 | 0.98 |
| | p(FTP)V1 | 1.00 | 1.00 | 1.00 |
| | FOT 5 (s) | 27 | 18.45 | 24.25 |
| 0.8 mm, aging | No. of Burning Drops | 2 | 0 | 0 |
| | p(FTP)V0 | 0.19 | 0.98 | 1.00 |
| | p(FTP)V1 | 0.28 | 1.00 | 1.00 |
| | FOT 5 (s) | 35.15 | 21.5 | 16.35 |
| MVR (285 C./6.7 kg/360 s) | cm³/10 min | 7.9 | 12.0 | 19.3 |
| MVR (285 C./6.7 kg/1080 s) | cm³/10 min | 19.7 | 23.8 | 31.4 |
| Through Plane TC | W/(m*K) | 1.9 | 1.9 | 1.588 |

The data in Table 4 shows by adding different loading $H_3PO_3$, a V0@0.8 mm flame performance is achieved. Additionally, MVR data is above 10 cm³/10 min.

TABLE 4

| | | Example No. | | | | | | |
|---|---|---|---|---|---|---|---|---|
| | | EX 9 | EX 10 | EX 11 | EX 12 | EX 13 | EX 14 | EX 15 |
| PA6 | wt % | 34.34925 | 34.3485 | 34.347 | 34.344 | 34.34 | 34.3 | 34.2 |
| Stabilizer/mold release | wt % | 0.65 | 0.65 | 0.65 | 0.65 | 0.65 | 0.65 | 0.65 |
| Mg(OH)₂ (wt %) | wt % | 55 | 55 | 55 | 55 | 55 | 55 | 55 |
| BN | wt % | 10 | 10 | 10 | 10 | 10 | 10 | 10 |
| H₃PO3 | wt % | 0.00075 | 0.0015 | 0.003 | 0.006 | 0.01 | 0.05 | 0.15 |
| 0.8 mm, normal | No. of Burning Drops | 0 | 0 | 0 | 0 | 0 | 0 | 0 |
| | p(FTP)V0 | 1.00 | 1.00 | 0.99 | 0.96 | 0.72 | 1.00 | 1.00 |
| | p(FTP)V1 | 1.00 | 1.00 | 1.00 | 1.00 | 1.00 | 1.00 | 1.00 |
| | FOT 5 (s) | 21.75 | 21.05 | 24.05 | 27.4 | 31.15 | 20.75 | 25.1 |
| 0.8 mm, aging | No. of Burning Drops | 0 | 0 | 0 | 0 | 0 | 0 | 0 |
| | p(FTP)V0 | 1.00 | 1.00 | 1.00 | 1.00 | 1.00 | 1.00 | 1.00 |
| | p(FTP)V1 | 1.00 | 1.00 | 1.00 | 1.00 | 1.00 | 1.00 | 1.00 |
| | FOT 5 (s) | 24.65 | 24.25 | 30.85 | 24.75 | 21.6 | 26.8 | 30.5 |
| MVR (285 C./6.7 kg/360 s) | cm³/10 min | 18.2 | 15.3 | 10.9 | 18.6 | 17.7 | 14.2 | 18.3 |
| MVR (285 C./6.7 kg/1080 s) | cm³/10 min | 29.9 | 25.3 | 15 | 26.9 | 31.6 | 27.7 | 25.9 |
| Through Plane TC | W/(m * K) | 1.466 | 1.551 | 1.523 | 1.602 | 1.512 | 1.533 | 1.57 |

The data in Table 5 shows that replacing 0.15% $H_3PO_3$ with $H_3BO_3$ in the same loading, a V0 @ 0.8 mm (with similar MVR value) can be achieved.

TABLE 5

| Example No. | | EX 7 | EX16 |
|---|---|---|---|
| PA6 | wt % | 33.3 | 33.3 |
| Stabilizer/mold release | wt % | 0.65 | 0.65 |
| Mg (OH)2 (wt %) | wt % | 55 | 55 |
| BN | wt % | 10 | 10 |
| H₃BO₃ | wt % | | 0.15 |
| H₃PO₃ | wt % | 0.15 | |
| 0.8 mm, normal | No. of Burning Drops | 0 | 0 |
| | p(FTP)V0 | 1.00 | 1.00 |
| | p(FTP)V1 | 1.00 | 1.00 |
| | FOT 5 (s) | 18.45 | 19.05 |
| 0.8 mm, aging | No. of Burning Drops | 0 | 0 |
| | p(FTP)V0 | 0.98 | 1.00 |
| | p(FTP)V1 | 1.00 | 1.00 |
| | FOT 5 (s) | 21.5 | 21.45 |
| MVR (285 C./6.7 kg/360 s) | cm³/10 min | 12.0 | 15.8 |
| MVR (285 C./6.7 kg/1080 s)d | cm³/10 min | 23.8 | 26.3 |
| Through Plane TC | W/(m*K) | 1.9 | 1.9 |

What is claimed is:
1. A composition comprising:
   a. from about 20 wt % to about 80 wt % of a polymer component;
   b. from about 15 wt % to about 70 wt % of a flame retardant component, wherein the flame retardant component comprises $Mg(OH)_2$, $H_2Mg_3(SiO_3)_4$, γ-AlO(OH), a-AlO(OH), or $Al(OH)_3$, or a combination thereof; and
   c. from about 0.01 wt % to about 5 wt % of an acid component, wherein the acid component comprises phosphorous acid, boric acid, aluminum diethyl phosphinic acid, or zinc phosphate, or a combination thereof;

wherein the combined weight percent value of all components does not exceed 100 wt %;
wherein all weight percent values are based on the total weight of the composition; and
wherein the composition has:
  i. a thermal conductivity of at least about 0.5 W/mK for through plane thermal conductivity;
  ii. flame retardancy of at least V1 at 3 mm using the UL94 test standard; and
  iii. melt volume flow rate of at least 5 cm$^3$/10 min using ASTM D 1238.

2. The composition of claim 1, wherein the polymer component is present in an amount from about 30 wt % to about 50 wt %.

3. The composition of claim 1, wherein the flame retardant component is present in an amount from about 50 wt % to about 60 wt %.

4. The composition of claim 1, wherein the acid component is present in an amount from about 0.1 wt % to about 1 wt %.

5. The composition of claim 1, wherein the composition has a thermal conductivity (TC) of at least about 1.5 W/mK for through plane thermal conductivity.

6. The composition of claim 1, wherein the composition has flame retardancy of at least V1 at about 0.8 mm using the UL94 test standard.

7. The composition of claim 1, wherein the composition has flame retardancy of V0 at about 0.8 mm using the UL94 test standard.

8. The composition of claim 1, wherein the composition has melt volume flow rate (MVR) of at least 10 cm$^3$/10 min using ASTM D 1238.

9. The composition of claim 1, further comprising from greater than 0 wt % to about 5 wt % of a char-forming agent comprising one or more of an organopolysiloxane and a polydimethylsiloxane.

10. The composition of claim 1, further comprising from greater than 0 wt % to about 2 wt % of an anti-flame dripping agent, wherein the anti-flame dripping agent comprises multi-functional modified styrene-acrylic oligomers; multi-functional amino or carboxyl chain extenders; a mixture of poly(tetrafluoroethylene) and poly(stryrene-acrylonitrile); or a combination thereof.

11. The composition of claim 1, further comprising from greater than 0 wt % to about 60 wt % of a filler, wherein the filler comprises AlN, Al$_4$C$_3$, Al$_2$O$_3$, BN, AlON, MgSiN$_2$, SiC, Si$_3$N$_4$, graphite, expanded graphite, graphene, carbon fiber; ZnS, CaO, MgO, ZnO, TiO$_2$, CaCO$_3$, mica, BaO, BaSO$_4$, CaSiO$_3$, ZrO$_2$, SiO$_2$, glass beads, glass fiber, MgO.xAl$_2$O$_3$, CaMg(CO$_3$)$_2$, ceramic-coated graphite, or a clay; or a combination thereof.

12. The composition of claim 1, wherein the polymer component comprises a polypropylene, polyethylene, ethylene based copolymer, polycarbonate, polyamide, polyester, polybutylene terephthalate, polyethylene terephthalate, polycyclohexylenedimethylene terephthalate, liquid crystal polymers, polyphenylene sulfide, polyphenylene ether, polyphenylene oxide-polystyrene blends, polystyrene, high impact modified polystyrene, acrylonitrile-butadiene-styrene terpolymer, acrylic polymer, polyetherimide, polyurethane, polyetheretherketone, poly ether sulphone, or a combination thereof.

13. An article formed from the composition of claim 1.

14. A method comprising, producing a composition by mixing:
  a. from about 20 wt % to about 80 wt % of a polymer component;
  b. from about 15 wt % to about 70 wt % of a flame retardant component, wherein the flame retardant component comprises Mg(OH)$_2$, H$_2$Mg$_3$(SiO$_3$)$_4$, y-AlO(OH), a-AlO(OH), or Al(OH)$_3$, or a combination thereof; and
  c. from about 0.01 wt % to about 5 wt % of an acid component, wherein the acid component comprises phosphorous acid, boric acid, aluminum diethyl phosphinic acid, or zinc phosphate, or a combination thereof;
wherein the combined weight percent value of all components does not exceed 100 wt %;
wherein all weight percent values are based on the total weight of the composition; and
wherein the composition has:
  i. a thermal conductivity of at least about 0.5 W/mK for through plane thermal conductivity;
  ii. flame retardancy of at least V1 at 3 mm using the UL94 test standard; and
  iii. melt volume flow rate of at least 5 cm$^3$/10 min using ASTM D 1238.

15. The method of claim 14, wherein the acid component comprises phosphorous acid or boric acid, or both and is present in an amount from about 0.1 wt % to about 1 wt %.

16. The method of claim 14, wherein the composition has a thermal conductivity (TC) of at least about 1.5 W/mK for through plane thermal conductivity.

17. The method of claim 14, wherein the composition has flame retardancy of at least V1 at about 0.8 mm using the UL94 test standard and a melt volume flow rate (MVR) of at least 10 cm$^3$/10 min using ASTM D 1238.

* * * * *